US012736931B2

(12) United States Patent
Kloepper et al.

(10) Patent No.: US 12,736,931 B2
(45) Date of Patent: Sep. 15, 2026

(54) PREDICTING PROCESS VARIABLES BY SIMULATION BASED ON AN ONLY PARTIALLY MEASURABLE INITIAL STATE

(71) Applicant: ABB Schweiz AG, Baden (CH)

(72) Inventors: Benjamin Kloepper, Mannheim (DE); Rikard Hansson, Gothenburg (SE); Helge Didriksen, Oslo (NO); Elise Thorud, Oslo (NO)

(73) Assignee: ABB Schweiz AG, Baden (CH)

( * ) Notice: Subject to any disclaimer, the term of this patent is extended or adjusted under 35 U.S.C. 154(b) by 324 days.

(21) Appl. No.: 18/394,328

(22) Filed: Dec. 22, 2023

(65) Prior Publication Data

US 2024/0126222 A1 Apr. 18, 2024

Related U.S. Application Data

(63) Continuation of application No. PCT/EP2022/065004, filed on Jun. 2, 2022.

(30) Foreign Application Priority Data

Jun. 23, 2021 (EP) .................................... 21181084

(51) Int. Cl.
*G05B 13/04* (2006.01)

(52) U.S. Cl.
CPC ......... *G05B 13/042* (2013.01); *G05B 13/041* (2013.01); *G05B 13/048* (2013.01)

(58) Field of Classification Search
CPC .. G05B 13/041; G05B 13/042; G05B 13/048; G05B 17/02; G05B 19/41885; G05B 23/0254; G05B 2219/32194
See application file for complete search history.

(56) References Cited

U.S. PATENT DOCUMENTS 6,816,822 B1 11/2004 Hess et al.
9,098,078 B2 * 8/2015 Liu ........................ G05B 13/04
(Continued)

FOREIGN PATENT DOCUMENTS

CN 109918831 A 6/2019
WO WO 2020/047653 A1 3/2020

OTHER PUBLICATIONS

European Patent Office, International Search Report in International Patent Application No. PCT/EP2022/065004, 3 pp. (Sep. 29, 2022).
(Continued)

*Primary Examiner* — Nicholas Klicos
(74) *Attorney, Agent, or Firm* — Fitch Even Tabin & Flannery LLP

(57) ABSTRACT

A method for predicting based on the state of an industrial process at a first point in time that is described by a process snapshot record with values of a first set of variables a value of at least one process variable of the industrial process at a second, later point in time, includes mapping using a machine learning model the process snapshot record to at least one initial state record; providing the initial state record to a simulation model; simulating using the simulation model the further development of the process; obtaining from the simulation model a final state record; and determining based on the final state record the sought value of the process variable at the second point in time.

8 Claims, 2 Drawing Sheets

(56) References Cited

U.S. PATENT DOCUMENTS

| | | | | |
|---|---|---|---|---|
| 2007/0275471 | A1* | 11/2007 | Coward | E21B 43/122 436/55 |
| 2016/0042272 | A1* | 2/2016 | Mohaghegh | E21B 43/267 706/19 |
| 2017/0364043 | A1* | 12/2017 | Ganti | G05B 17/02 |
| 2019/0377306 | A1* | 12/2019 | Harvey | G05B 13/027 |
| 2020/0356087 | A1* | 11/2020 | Elbsat | G05B 23/0254 |
| 2020/0379442 | A1 | 12/2020 | Chan et al. | |
| 2021/0011459 | A1 | 1/2021 | Subbiah | |
| 2021/0049460 | A1 | 2/2021 | Ahn et al. | |
| 2021/0333768 | A1* | 10/2021 | Umemoto | G05B 23/0243 |

OTHER PUBLICATIONS

European Patent Office, Written Opinion in International Patent Application No. PCT/EP2022/065004, 7 pp. (Sep. 29, 2022).

European Patent Office, Office Action in European Patent Application No. 21181084.1, 6 pp. (Nov. 2, 2023).

European Patent Office, Extended European Search Report in European Patent Application No. 21181084.1, 9 pp. (Jan. 4, 2022).

Office Action issued in corresponding Chinese Application No. 202280044361.9; dated Apr. 18, 2026; In Chinese with English machine translation (9 pages).

* cited by examiner

PREDICTING PROCESS VARIABLES BY SIMULATION BASED ON AN ONLY PARTIALLY MEASURABLE INITIAL STATE

CROSS-REFERENCE TO RELATED APPLICATIONS

The instant application claims priority to International Patent Application No. PCT/EP2022/065004, filed Jun. 2, 2022, and to European Patent Application No. 21181084.1, filed Jun. 23, 2021, each of which is incorporated herein in its entirety by reference.

FIELD OF THE DISCLOSURE

The present disclosure relates to industrial process control based on a process snapshot record with observations obtained from the process.

BACKGROUND OF THE INVENTION

An industrial process is usually run according to a strategy that is to optimize the process with respect to a particular higher-level goal, such as the quality of the resulting product or a minimal energy consumption. The relationship between a control action and the impact that this control action has on the higher-level goal may be quite complex.

U.S. Pat. No. 6,816,822 B1 therefore discloses to augment the optimization of a process towards an operating target with a simulation of the process that runs at a faster rate than the run rate of the optimization cycle. This simulation employs a model of the process.

BRIEF SUMMARY OF THE INVENTION

The present disclosure describes embodiments for improving the prediction of process variables of an industrial process using a simulation model of the process in situations where not all information needed by this simulation model is readily available.

In one aspect, the present disclosure describes a computer-implemented method for predicting a value of at least one process variable of an industrial process. Herein, the term “process variable” is not to be construed limiting in the sense that the variable must relate to a quantity that is physically measured and subsequently used as a feedback in a control loop in the context of the process. Rather, the term is also to comprise any variable that is relevant from the perspective an entity who executes the process and that is available as the outcome of a simulation model for the process.

The prediction is based on the state of the industrial process at a first point in time that is described by a process snapshot record with values of a first set variables. This first set of variables may comprise process variables, such as measurement values of physical quantities that are obtainable in an industrial plant executing the process. The first set of variables may also comprise state variables, such as indications whether a certain piece of equipment is active or not, or whether a certain valve is open or closed. The prediction yields the sought value of the process variable at a second point in time that is later than the first point in time. That is, the method is not limited to looking from the present into the future. Rather, the past behavior of the process may be analyzed as well according to historical data. This may be useful to find explanations for such past behavior, and/or to find an alternative path of actions that would yield superior results with respect to a given optimization objective, such as product quality or energy consumption.

In the course of the method, the process snapshot record is mapped to at least one initial state record by at least one trained machine learning model. This initial state record characterizes the state of the process at the first point in time. The main difference between the process snapshot record on the one hand and the initial state record on the other hand is that the initial state record uniquely identifies the initial state of the process, whereas the process snapshot record does not contain all information that is required to uniquely identify this initial state. Consequently, one and the same process snapshot record may be compatible with multiple distinct initial states of the process.

BRIEF DESCRIPTION OF THE SEVERAL VIEWS OF THE DRAWING(S)

DETAILED DESCRIPTION OF THE INVENTION

Figure 1:
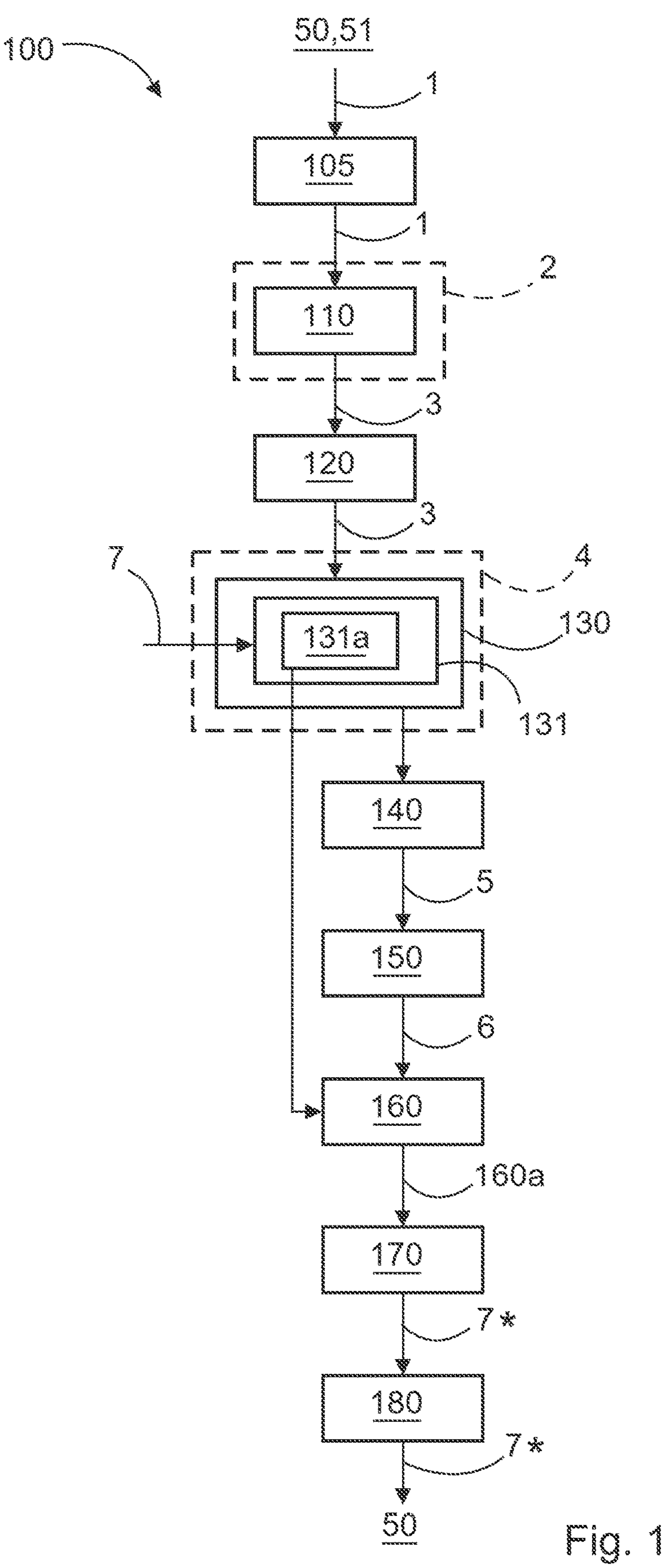
FIG. 1 is a flowchart for a method in accordance with the disclosure.
Figure 2:
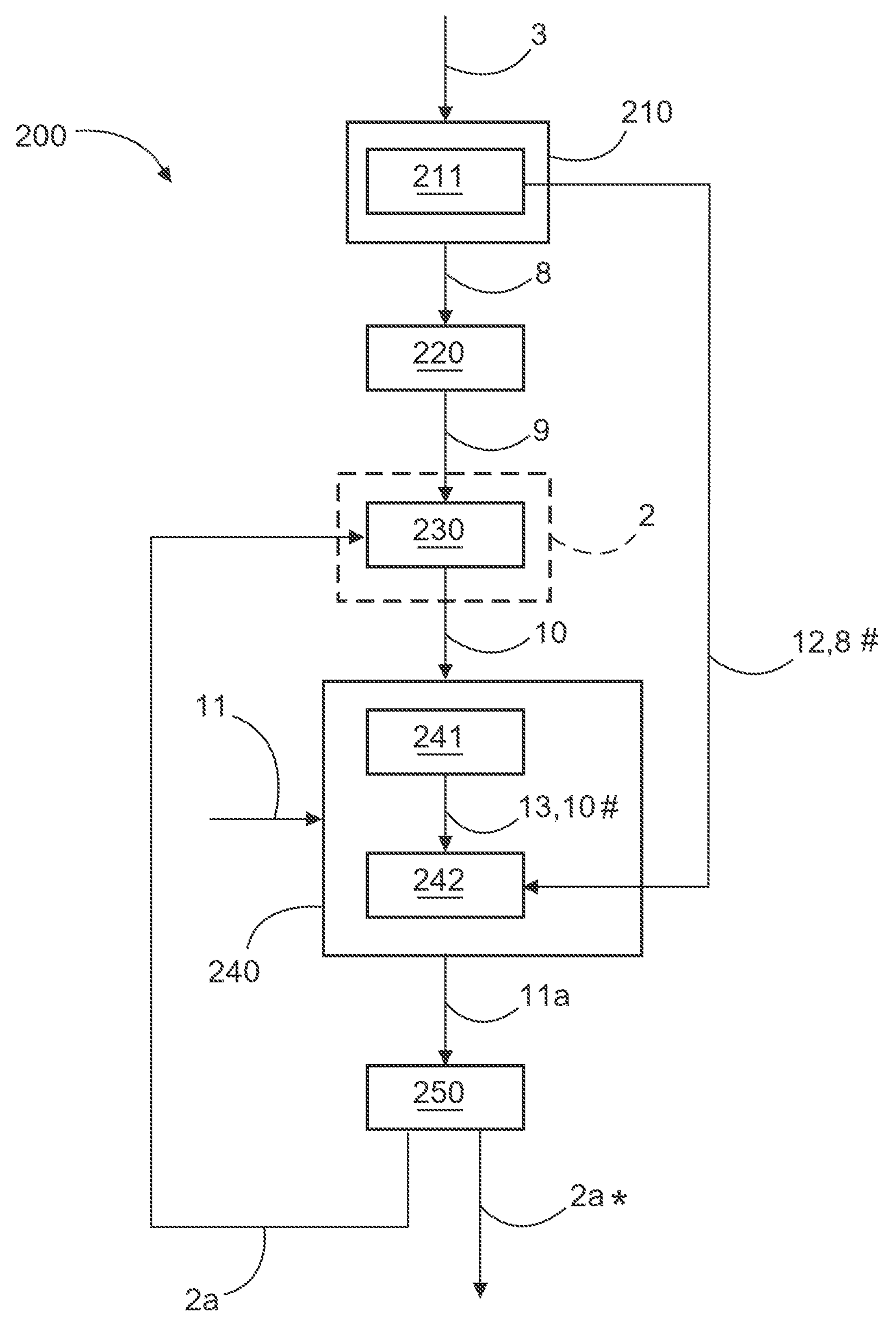
FIG. 2 is a flowchart for an alternative method in accordance with the disclosure.

FIG. 1 is an exemplary embodiment of the method 100 for predicting a value 6 of a process variable of a process; FIG. 2 is an exemplary embodiment of the method 200 for training a machine learning model 2 for use in the method 100.

FIG. 1 is a schematic flow chart of an embodiment of the method 100 for predicting a value 6 of a process variable of a process. In optional step 105, a process snapshot record 1 is obtained from an industrial plant 50 that is used to execute the industrial process, and/or from a plant historian 51 of the industrial plant 50.

In step 110, the process snapshot 1 is mapped to at least one initial state record 3 by means of the trained machine learning model 2. This initial state record 3 characterizes the state of the process at the first point in time and contains an estimate of at least one hidden variable that is not comprised in the process snapshot record 1. In step 120, the initial state record 3 is provided to a simulation model 4 of the process. In step 130, using the simulation model 4, the further development of the process is simulated.

Herein, according to block 131, at least one candidate input 7 may be provided to the simulation model 4. This candidate input 7 corresponds to a control action performed on the process between the first point in time and the second point in time. According to block 131*a*, separate simulations of the further development of the process may be performed based on different candidate inputs 7.

In step 140, a final state record 5 that characterizes the state of the process at the second point in time is obtained from the simulation model 4. In step 150, based on this final state record 5, the sought value 6 of the process variable at the second point in time is determined. In step 160, if multiple simulations have been performed based on different candidate inputs 7 according to block 131*a*, the value 6 of the process variable obtained in each such simulation is mapped to a rating 160*a* according to a predetermined criterion. In particular, this predetermined criterion may depend on a higher-level goal towards which the execution of the process is being optimized. In step 170, the control action corresponding to the candidate input 7 that results in a value of the process variable with the best rating is chosen as a best control action 7*. In step 180, this best control action 7* is performed on the industrial plant 50.

FIG. 2 is a schematic flow chart of an embodiment of the method 200 for training at least one machine learning model 2 for use in the method 100. In step 210, using a simulation model 4 of an industrial process, the development of the process from an initial state characterized by an initial state record 3 is simulated over a first time period to an intermediate state at an intermediate point in time characterized by a simulated intermediate state record 8.

In step 220, a process snapshot record 9 that would be observable in an industrial plant 50 executing the process according to the simulation is determined. As discussed before, the composition of this process snapshot record 9 depends mainly on what is observable in the concrete given industrial plant 50.

In step 230, the process snapshot record 9 is mapped to a candidate intermediate state record 10. In step 240, a difference between the candidate intermediate state record 10, and/or a further processing result 10# obtained based on this candidate intermediate state record 10, on the one hand and the simulated intermediate state record 8, and/or the corresponding processing result 8# obtained based on this simulated intermediate state record 8, on the other hand is rated by means of a predetermined loss function 11.

As discussed before, in particular, the candidate intermediate state record 10 may be directly compared to the simulated intermediate state record 8. In this manner, it is measured how well the machine learning model 2 undoes the "dumbing down" of the original simulated intermediate state record 8 to the process snapshot record 9.

According to block 211, the simulation may be continued through the intermediate point in time and a second time period up to a target point in time characterized by a simulated target state record 12. According to block 241, the same simulation model 4 may then be used to simulate starting from the candidate intermediate state record 10, the development of the process up to the target point in time.

This yields a candidate target state record 13 as the further processing result 10# obtained from the candidate intermediate state record 10. According to block 242, this further processing result 10 # may be compared with the simulated target state record 12 as the corresponding processing result 8# obtained from the simulated intermediate state record 8. In this manner, it is measured how a change from the simulated intermediate state record 8 to the candidate intermediate state record 10 affects the finally obtained target state record.

In step 250, parameters **2*a* that characterize the behavior of the machine learning model 2 are optimized such that the mapping of further process snapshot records 9 to candidate intermediate state records 10 is likely to improve the rating 11*a* by the loss function 11. The finally optimized state of the parameters 2*a* is labelled with the reference sign 2*a****.

In the simple example of a reactor vessel where a reaction between two educts yields a product, a process snapshot record may comprise the temperature and pressure inside the vessel, as well as the fill level and the mean density of the medium inside the vessel, as observable quantities. But this description is not sufficient for simulating how fast the reaction into the product will proceed. The speed of the reaction further depends on how well the two educts are mixed inside the vessel. If the vessel contains a homogenous mixture of the two educts, the effective surface on which the reaction may take place is maximal, and the reaction will proceed fastest. But if the two educts are stratified, so that a first phase with the first educt lies on top of a second phase with the second educt, the effective surface that is available for the reaction is minimal, and the reaction will proceed slowest. The initial state record therefore needs to contain some indication as to how well the two educts are mixed. But this may not be measurable directly. The degree of mixing is therefore an example of a hidden variable.

Therefore, in the context of the method, the initial state record produced by the machine learning model contains an estimate of at least one hidden variable that is not comprised in the process snapshot record. The hidden variable may comprise the process variable whose value at the second point in time is sought. The more probable use case is that the process variable whose value is sought is one that is, in principle, measurable in the plant executing the process, whereas obtaining a prediction of its value at the second point in time using the simulation model requires one or more other variables that are not directly obtainable in the concrete plant.

The initial state record is provided to a simulation model of the process. Using the simulation model, the further development of the process is simulated. From the simulation model, a final state record that characterizes the state of the process at the second point in time is obtained. Based on this final state record, the sought value of the process variable at the second point in time is obtained.

The machine learning model bridges a gap between the information that is available in a process snapshot on the one hand, and the information that is needed to completely characterize the state of the process so that its further development may be accurately predicted by means of the simulation model. Such a gap frequently arises if an already existing simulation model is to be re-used on a particular given plant. For example, a simulation model may have been designed on a first plant where there is a sensor for measuring the flow of a certain substance, and may therefore make use of this flow. But a second plant may not have a sensor for the flow. Rather than re-building a simulation model for the second plant from scratch, the existing simulation model may be re-used by obtaining the required flow from the machine learning model.

Thus, in a particularly advantageous embodiment, the process snapshot is obtained from an industrial plant that is used to execute the industrial process, and/or from a plant historian of the industrial plant. In particular, the hidden variable may be a variable that is not directly obtainable from the industrial plant and/or plant historian.

The machine learning model may be any parametrized function with trainable parameters that has a large power for generalization to unseen data. For example, the machine learning model may be or comprise an artificial neural network, ANN. The primary parameters that characterize the behavior of the ANN comprise weights with which inputs to a neuron or other processing unit are summed into a weighted sum into an "activation" of this neuron or other processing unit. By applying a nonlinear function, the final output of this neuron or other processing unit may then be computed from the activation. Other machine learning models that may be used include machine learning algorithms for regression problems, such as Linear Regression, Gaussian Regression, Decision Tree Regression, Random Forest Regression, Gradient Boosting Tree Regression or many more.

The help of the machine learning model may be enlisted in any suitable manner For example, the operator of the plant may be provided with the trained model and perform the mapping on-premises. But the mapping of snapshot records to initial state records may also, for example, be provided as a cloud service.

A main use case of predicting values of process variables is the analysis of how the process will react in response to certain control actions, so as to determine which control actions are likely to be advantageous with respect to the higher-level goal and which are not. This is a lot more tractable than directly modelling the impact of control actions on the higher-level goals.

Therefore, in a particularly advantageous embodiment, at least one candidate input is further provided to the simulation model. This candidate input corresponds to a control action performed on the process between the first point in time and the second point in time. In this manner, the effect of the control action on the sought process variable may be studied.

The control action may, for example, comprise activating or deactivating at least one piece of equipment that is used to execute the process; and/or opening or closing at least one valve or other device that controls the a of at least one substance during execution of the process; and/or modifying a set-point value of at least one controller that participates in the execution of the process.

Large industrial plants are typically controlled using distributed control systems, DCS. A DCS contains a plurality of low-level controllers. Each such low-level controller acts upon the process in order to keep a certain process variable (such as a temperature or a pressure) at a certain set-point value.

In a further particularly advantageous embodiment, separate simulations of the further development may be performed based on different candidate inputs that correspond to different candidate control actions. For each such simulations, the obtained value of the process variable at the second point in time may then be rated according to a predetermined criterion. For example, it may be evaluated according to any suitable metric how good the value of the process variable is with respect to a higher-level goal. The candidate control action corresponding to the candidate input that results in a value of the process variable with the best rating may be chosen as a best control action. For example, the chosen best control action may then be performed on the industrial plant, so as to move execution of the process on this plant towards an improvement with respect to a higher-level goal.

In this context, it is advantageous if the machine learning model produces not just one initial state record, but rather a probability distribution of such initial state records. From this probability distribution, multiple initial state records may be drawn to introduce a degree of variability and determine the confidence bounds regarding which control action is the best one.

A choice of the best control action is available because the simulation is able to run at a much higher speed compared with the actual execution of the process. Thus, the plant operator may try out a number of candidate control actions in a "what if" manner before the decision for one of these actions falls due. On typical on-premises hardware, a simulation may run at about five times the speed of the actual process execution. This may be speeded up further in a cost-effective manner by outsourcing the simulation to a reasonably powerful cloud computing instance. Cloud instances are very good value for money particularly for "bursty" tasks that require a large amount of computing power for a short time. In particular, the testing of different candidate inputs may be parallelized by assigning the simulation that is based on each candidate input to a cloud instance of its own. Hundreds or even thousands of such worker instances may be created at once in order to get the best control action in the time required for simulating only one control action. The simulation may even be made more cost-effective by fanning out to many worker instances. According to the pricing models of many cloud providers, the price for a computing instance increases more than proportionally with the computing power of this instance. Thus, renting a given total amount of power in the form of many small instances may cost less than renting the same total amount in the form of fewer large instances.

One important use case for exploring candidate control actions using "what if" simulations is an industrial process that comprises separation of an oil/gas well stream into oil, gas and water. In this use case, the control action comprises an action with the goal of improving the purity of the separated oil, gas and water. When a control action is performed on the actual plant, it takes some time for the effect to be visible in the sought purity. By the time at which the effect becomes visible, a large cost may already have been incurred if the candidate control action was not good. For example, if the control action caused the water to be contaminated with more oil, there is now a large amount of water that cannot be re-injected into the oil field in order to keep the oil pressure up. Rather, this water has to be properly disposed of as contaminated waste. And more such water will continue to accrue until a reversal of the bad control action manifests itself in the purity.

Another use case where the possibility to test candidate control actions on the actual plant is severely limited is an industrial process that comprises generation of electricity in a fuel-burning power station. Here, the control action comprises an action with the goal of: reducing the amount of solid waste left over from combustion of the fuel; and/or reducing the emission of at least one pollutant; and/or adapting the amount of power generated by the power station to a given power demand profile.

Here, it is important again to get the action on the real plant right the first time in order to reduce unplanned outages, operate the plant within legal limits, and operate the plant cost-effectively. In particular, it is very important to match the generated amount of power to a given power demand profile because in the electricity grid as a whole, generation and demand must be balanced at all times. A thermal power station running on a solid fuel, such as coal or household waste, has quite some amount of inertia with which the amount of generated power responds to a control action. In the meantime, while there is a gap between generation and demand, this gap is filled with short-term power bought on the spot market. Depending on the overall situation of the grid, a few minutes of having to buy short-term power may cost more than would have been earned by delivering the correct amount of power for hours. "What if" simulations based on candidate control actions may reduce the propensity for such costly mistakes.

In a particularly advantageous embodiment, a time interval between the first point in time and the second point in time is chosen to be between 10 minutes and 90 minutes. This time frame is, in many use cases, commensurate with the amount of inertia with which the sought process variable responds to a new control action. For an ideal process on an ideal plant that instantaneously responds to any control action, no simulation would be needed.

The temporal granularity (time steps) in which the simulation is performed may, for example, be on the order between 0.5 and 5 minutes.

The invention also provides a method for training at least one machine learning model for use in the prediction method discussed above. In the course of this method, the development of an industrial process is simulated using a simulation model of the process. The simulation starts from an initial state characterized by an initial state record and covers a first time period to an intermediate state at an intermediate point in time. This intermediate state is characterized by a simulated intermediate state record.

From the simulation up to the intermediate point in time, a process snapshot record is determined. This process snapshot record would be observable in an industrial plant executing the process according to the simulation. The transformation from the simulated intermediate state record to the process snapshot record is dependent on the concrete industrial plants. For example, if the simulated intermediate state record comprises a certain physical quantity, the presence or absence of means for measuring this physical quantity may decide over whether this physical quantity is included in the process snapshot record. That is, if the concrete plant in question does not support obtaining a physical quantity, this physical quantity may be left out of the process snapshot record.

The process snapshot record is mapped to a candidate intermediate state record by the to-be-trained machine learning model. A predetermined loss function then rates the difference between the candidate intermediate state record, and/or a further processing result obtained based on this candidate intermediate state record, on the one hand and the simulated intermediate state record, and/or the corresponding processing result obtained based on this simulated intermediate state record, on the other hand.

Parameters that characterize the behavior of the machine learning model are optimized such that the mapping of further process snapshot records to candidate intermediate state records is likely to improve the rating by the loss function. If the intermediate state records are written as vectors, the loss function may, for example, comprise a Euclidean distance between these vectors. This corresponds to the 2-norm of the difference vector between these vectors.

This training is a supervised training because the candidate intermediate state record, and/or the further processing result, is compared to something that is deemed to be "ground truth". This "ground truth" is provided by the simulation. No manual labelling of training data, as it is customary for most supervised training methods, is required.

In particular, directly comparing the candidate intermediate state record to the simulated intermediate state record is fast. The comparison will be performed many times during the training, so any economy here is magnified many times over.

However, this comes at the price of the simplifying assumption that all components of the intermediate state record are deemed to be equally important. But in reality, not every modification of a variable in the intermediate state record will have the same effect on every conceivable sought process variable.

Therefore, in a further advantageous embodiment, the simulation is continued through the intermediate point in time and a second time period up to a target point in time characterized by a simulated target state record. Using the same simulation model, starting from the candidate intermediate state record, the development of the process up to the target point in time is simulated for a second time. This yields a candidate target state record as the further processing result. The loss function then rates a difference between this further processing result and the simulated target state record as the corresponding processing result.

In this manner, a departure of the candidate intermediate state record from the simulated intermediate state record is penalized more severely by the loss function if it relates to an important variable that has a high impact on the candidate target state record. This depends on the properties of the simulation model. This consideration of the simulation model requires executing a new simulation every time the parameters of the machine learning model are updated during training. But the computational expense may be mitigated by combining the fast training based on the comparison of intermediate state records with the more accurate training based on the comparison of target state records.

For example, the training may begin with the fast training based on the comparison of intermediates state records, and move on to the more accurate training based on the comparison of target state records in response to the training process meeting a certain criterion, such as the value of the loss function falling below a certain threshold.

The two approaches for the training may also, for example, be combined using multi-task learning. A first machine learning model may be trained for the fast training, a second machine learning model may be trained for the more accurate training. Both machine learning models may share some part of their architecture (e.g., a common network part if neural networks are used), and/or part of their training (e.g., weights in neural networks).

As discussed before, the methods may be computer-implemented embodied in software. The invention therefore also provides a computer program with machine-readable instructions that causes the one or more computers to perform one of the methods discussed above when executed on one or more computers. Herein, embedded systems, microcontrollers and control devices (such as programmable logic controllers, PLC), and cloud computing instances that are able to execute machine-readable instructions are understood to be computers as well.

The disclosure also provides one or more non-transitory storage media and/or download products with the one or more computer programs. A download product is a product that may be sold in an online shop for immediate fulfillment by download. The invention also provides one or more computers with the one or more computer programs, and/or with the one or more non-transitory machine-readable storage media and/or download products.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

LIST OF REFERENCE SIGNS

- 1 process snapshot record for first point in time
- 2 machine learning model
- 2*a* parameters, characterize behavior of machine learning model 2
- 2*a finally optimized state of parameters 2***a*
- 3 initial state record, produced by machine learning model 2
- 4 simulation model of industrial process
- 5 final state record, produced by simulation model 4
- 6 sought value of process variable at second point in time
- 7 candidate input
- 7* best control action
- 8 simulated intermediate state record
- 8 #processing result obtained from simulated intermediate state record 8
- 9 snapshot record, produced from simulated intermediate state record 8
- 10 candidate intermediate state record, produced from snapshot record 9
- 10#processing result obtained from candidate intermediate state record 10
- 11 loss function
- 11*a* rating by loss function 11
- 50 industrial plant
- 51 historian of industrial plant 50
- 100 method for predicting value 6 of process variable
- 105 obtaining snapshot record 1 from plant 50, historian 51
- 110 mapping snapshot record 1 to initial state record 3
- 120 providing initial state record 3 to simulation model 4
- 130 simulating further development of process
- 131 providing candidate input 7 to simulation model 4
- 131*a* performing multiple simulations for different candidate inputs 7
- 140 obtaining final state record 5 from simulation model 4
- 150 determining sought value 6 from final state record 5
- 160 rating obtained value 6 for each simulation
- 160*a* rating produced in step 160
- 170 choosing best control action 7*
- 180 performing best control action 7* on plant 50
- 200 method for training machine learning model 2
- 210 simulating development based on initial state record 3
- 211 continuing simulation up to target point in time
- 220 determining process snapshot record 9
- 230 mapping process snapshot record 9 to candidate intermediate record 10
- 240 rating difference between candidate and simulated records/results
- 241 obtaining candidate target state record 13 by simulation
- 242 rating difference between target state records 12, 13
- 250 optimizing parameters 2*a*

What is claimed is:

1. A computer-implemented method for predicting, based on a state of an industrial process at a first point in time that is described by a process snapshot record with values of a first set of variables, a value of at least one process variable of the industrial process at a second, later point in time, the method comprising:

mapping using at least one trained machine learning model the process snapshot record to at least one initial state record, wherein this initial state record characterizes a state of the industrial process at the first point in time and contains an estimate of at least one hidden variable that is not comprised in the process snapshot record;

providing the initial state record to a simulation model of the industrial process;

simulating using the simulation model a further development of the industrial process;

obtaining from the simulation model a final state record that characterizes the state of the industrial process at the second point in time;

determining based on the final state record the sought value of the process variable at the second, later point in time;

providing at least one candidate input to the simulation model, wherein this candidate input corresponds to a control action performed on the industrial process between the first point in time and the second, later point in time;

performing separate simulations of the further development of the industrial process based on different candidate inputs;

for each such simulation, rating according to a predetermined criterion the obtained value of the process variable at the second point in time; and choosing the control action corresponding to the candidate input that results in a value of the process variable with the best rating as a best control action;

wherein the industrial process comprises separation of an oil/gas well stream into oil, gas and water, and the control action comprises an action with the goal of improving a purity of the separated oil, gas and water, or wherein the industrial process comprises generation of electricity in a fuel-burning power station, and the control action comprises an action with the goal of reducing an amount of solid waste left over from combustion of fuel; and/or reducing emission of at least one pollutant; and/or adapting an amount of power generated by the power station to a given power demand profile.

2. The method of claim 1, further comprising obtaining the process snapshot record from an industrial plant that is used to execute the industrial process, and/or from a plant historian of the industrial plant.

3. The method of claim 2, wherein the hidden variable is a variable that is not directly obtainable from the industrial plant and/or plant historian.

4. The method of claim 1, wherein the control action comprises:

activating or deactivating at least one piece of equipment that is used to execute the industrial process; and/or opening or closing at least one valve or other device that controls at least one substance during execution of the industrial process; and/or modifying a set-point value of at least one controller that participates in the execution of the industrial process.

5. The method of claim 1, further comprising performing the chosen best control action on an industrial plant.

6. The method of claim 1, wherein a time interval between the first point in time and the second point in time is between 10 minutes and 90 minutes.

7. A computer-implemented method for training at least one machine learning model for use in predicting, based on a state of an industrial process at a first point in time that is described by a process snapshot record with values of a first set of variables, a value of at least one process variable of the industrial process at a second, later point in time, comprising:

simulating using a simulation model of an industrial process a development of the industrial process from an initial state characterized by an initial state record over a first time period to an intermediate state at an intermediate point in time characterized by a simulated intermediate state record, wherein simulating the development of the industrial process comprises providing at least one candidate input to the simulation model, the candidate input corresponding to a control action performed on the industrial process between the first point in time and the second point in time, thereby modeling an effect of the control action on the at least one process variable;

determining from the simulation up to the intermediate point in time a process snapshot record that would be observable in an industrial plant executing the industrial process according to the simulation;

mapping by a machine learning model the process snapshot record to a candidate intermediate state record;

rating using a predetermined loss function a difference between the candidate intermediate state record and/or a further processing result obtained based on the candidate intermediate state record, and the simulated intermediate state record and/or the corresponding processing result obtained based on this simulated intermediate state record; and optimizing parameters that characterize the behavior of the machine learning model such that mapping of further process snapshot records to candidate intermediate state records tends to improve the rating by the predetermined loss function;

wherein the industrial process is one of:

(i) a separation of an oil/gas well stream into oil, gas, and water, and wherein the control action comprises an action with a goal of improving the purity of the separated oil, gas, and water; or (ii) a generation of electricity in a fuel-burning power station, wherein the control action comprises an action with a goal of reducing an amount of solid waste from fuel combustion, reducing emission of at least one pollutant, and/or adapting an amount of power generated to a given power demand profile.

8. The method of claim 7, further comprising:

continuing the simulation through the intermediate point in time and a second time period up to a target point in time characterized by a simulated target state record;

simulating using the simulation model starting from the candidate intermediate state record the development of the industrial process up to the target point in time, thereby obtaining a candidate target state record as the further processing result; and rating a difference between this further processing result and the simulated target state record as the corresponding processing result.

* * * * *